Jan. 19, 1971 M. NIRENBERG 3,556,833
APPARATUS FOR THE MANUFACTURE OF MULTICOLORED
AND IRIDESCENT MOLDINGS
Filed June 17, 1966 5 Sheets-Sheet 4
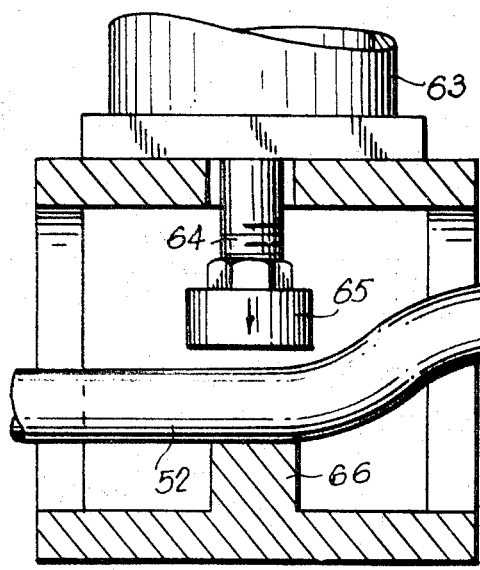
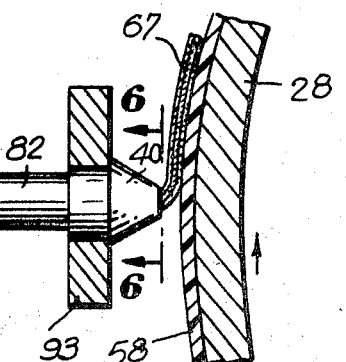
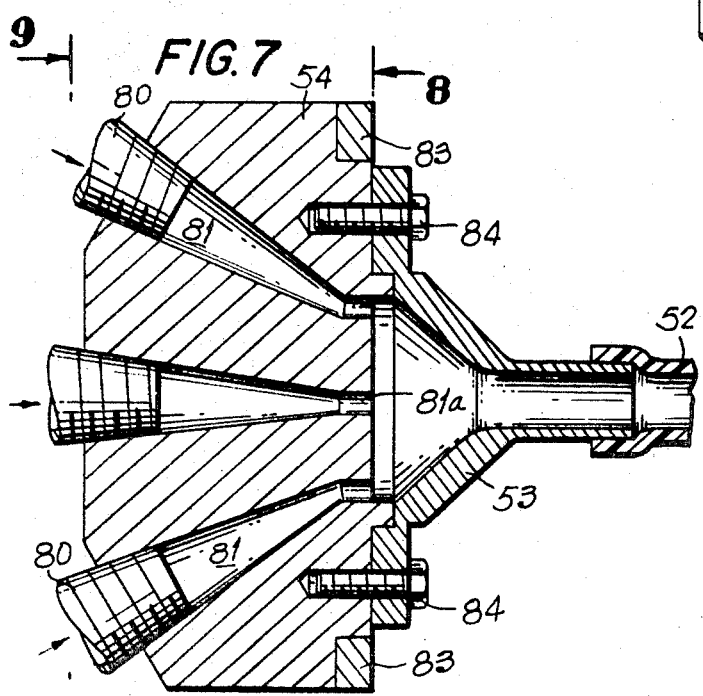
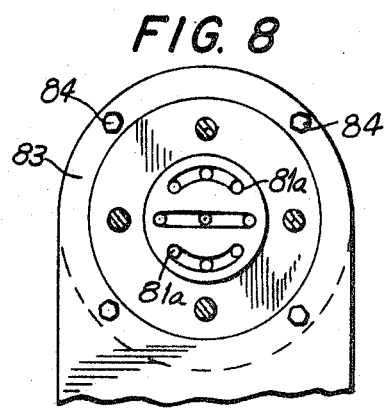
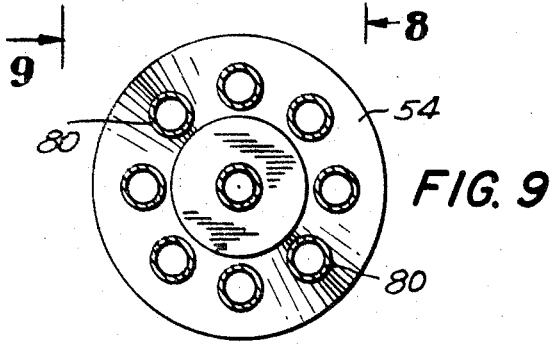
INVENTOR.
Morris Nirenberg
BY
Joseph Hirschmann
ATTORNEY

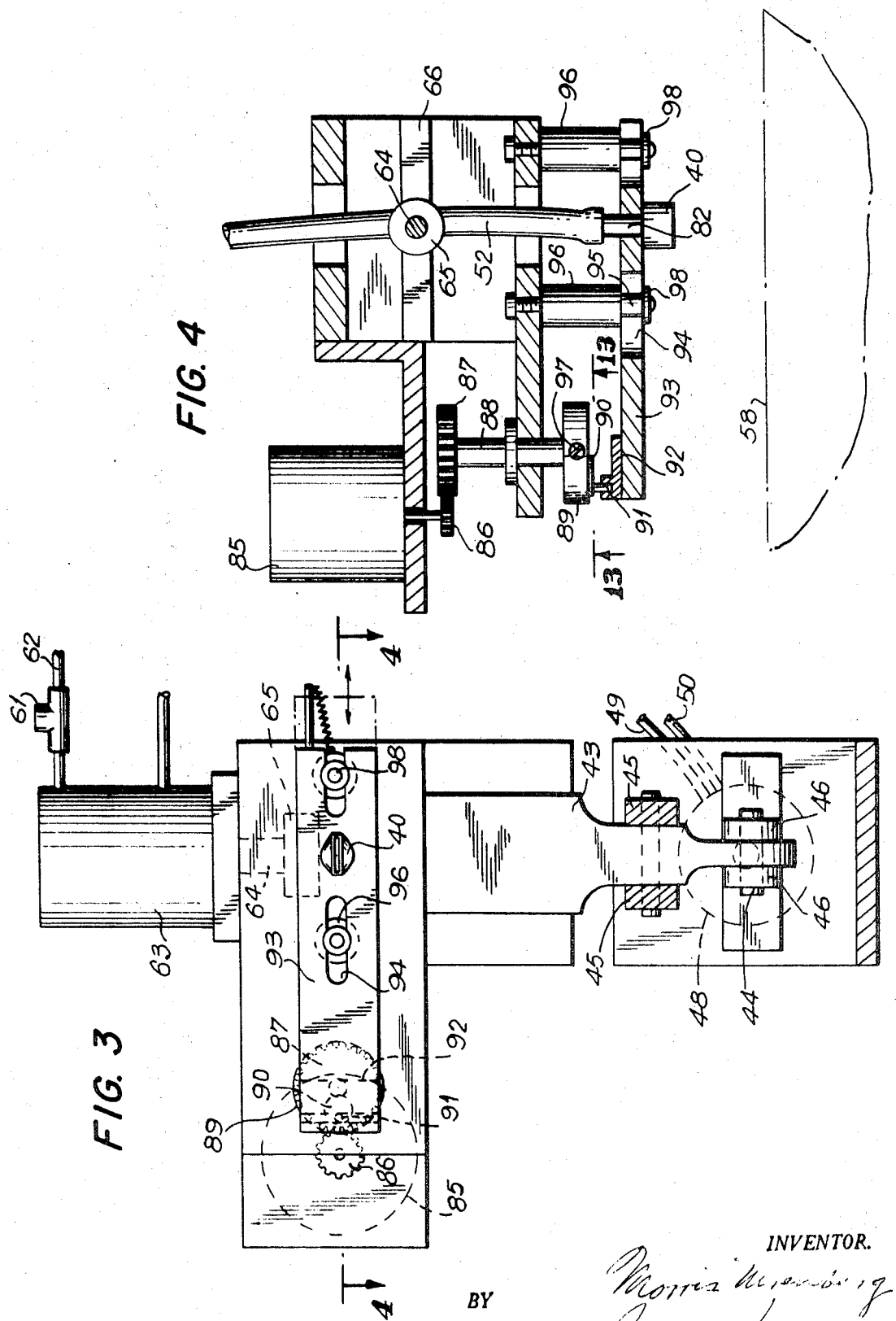

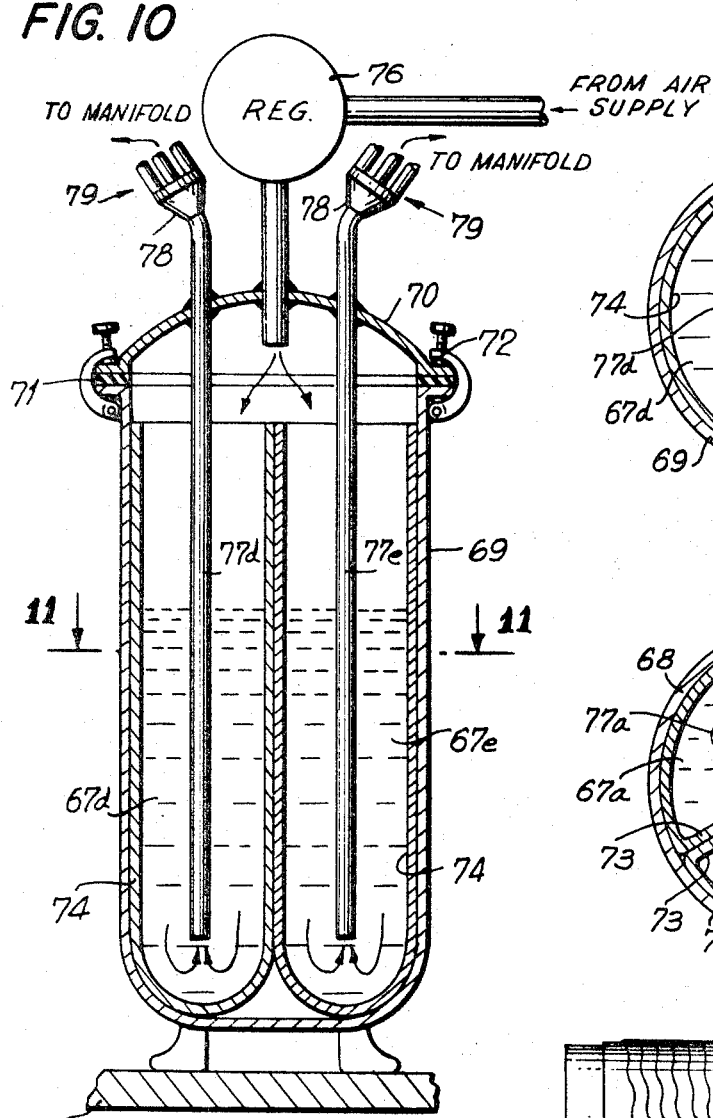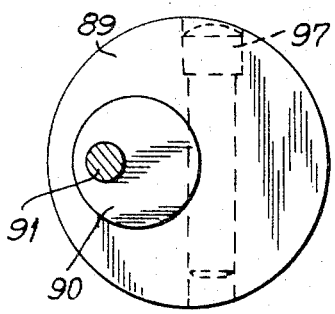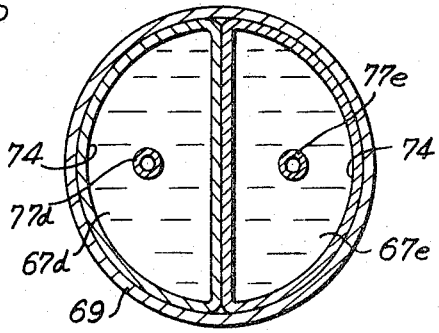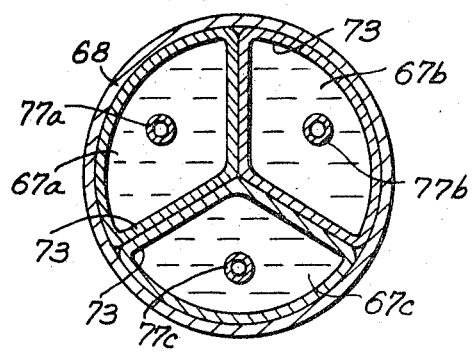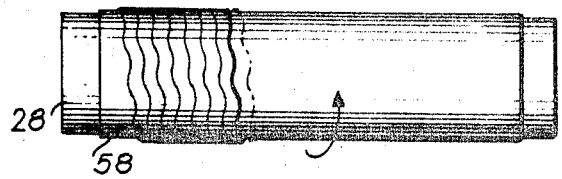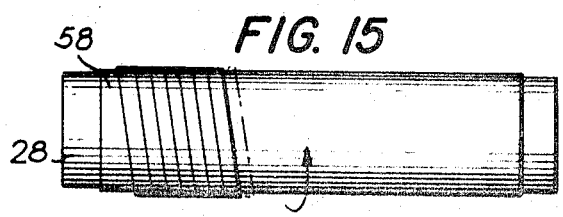

United States Patent Office 3,556,833
Patented Jan. 19, 1971

3,556,833
APPARATUS FOR THE MANUFACTURE OF MULTICOLORED AND IRIDESCENT MOLDINGS
Morris Nirenberg, North Woodmere, N.Y., assignor to Oceana International, Inc., New York, N.Y., a corporation of New York
Filed June 17, 1966, Ser. No. 558,347
Int. Cl. B44d 1/09
U.S. Cl. 117—44                    13 Claims

ABSTRACT OF THE DISCLOSURE

A process and apparatus are disclosed for distributing one or more moldable resins onto a backing film which is subsequently to be charged into a molding machine. The resin is deposited by a nozzle which reciprocates across the whole width of the film as it is rotated on a cylinder which is held against axial movement. The nozzle receives resin from a plurality of sources, the resin streams being differently colored, and certain or all of which may contain lustrous additions, so that molded articles having iridescent effects are obtained.

---

The present invention relates to the manufacture of molded articles of variegated color and, more particularly, of molded articles of iridescent luster.

More specifically, the invention relates to a process and apparatus for preparing a composite sheet of layup of heat-hardenable resin in a plurality of colors and preferably with a luster-producing material suspended therein for charging into a heated two-part compression mold having a plurality of cavities, such as a button mold.

In its preferred form, the present invention provides a process and apparatus for depositing upon a backing sheet a ribbon spiral of a heat-hardenable resin, the ribbon being composed of a plurality of individual rod-like or band-like elements of different color and/or different content or type of luster-producing suspensions, such sheet being adapted to be placed upon the bottom part of a two-part multicavity mold and then subjected to heat and pressure to produce a number of articles, and particularly of buttons, such as shirt or shank or other types of buttons, and also of other molded articles, the resin being of the addition type, such as polyester resins.

It is the general object of this invention to provide a machine of simple, compact and economical construction which is dependable in operation and which by various adjustments can produce differently constituted layers of resin upon a backing sheet, wound upon a rotating but axially fixed cylinder, such layer being composed of a plurality of extruded rods or bands each formed of sections of different color and/or different content of luster-producing additions, whereby upon molding such sheet in a multi-cavity mold, articles of multicolor character and particularly of iridescent nature can be obtained.

More specifically, it is an object of the invention to provide a process and machine of the type indicated wherein a nozzle which is supplied with resin under pressure travels back and forth across a backing film to distribute a rod or ribbon of viscous resin thereon, the film at the same time traveling in a direction perpendicular to the direction of travel of the nozzle, as by being wound around a cylinder which is rotated about its axis but which is supported against axial movement, whereby a predetermined amount of resin can be deposited on the film.

It is a further object of the invention to provide apparatus for distributing a rod or ribbon of viscous resin in which a large variety of feed ratios are easily and quickly available through a quick change gear box and without the need for different and expensive lead screws and nuts and hence without the need for laborious and time-consuming disassembly to substitute different lead screws and nuts.

Another and important object of the invention is to provide an apparatus wherein by simple operation of a lever the direction of travel of the nozzle can be reversed while keeping unchanged the direction of travel of the cylinder, so that the same layup on the film is insured in both directions of travel of the nozzle where top and bottom portion of the extruded rod or ribbon of resin are different, as where the top portion is iridescent while the bottom portion is opaque or of a solid color, so that both the travel of the nozzle in one direction and its return trip are productive.

It is a still further object of the invention to provide a construction wherein the lead screw is engaged by a split nut, whereby upon lifting of the split nut handle the lead screw is disengaged from the nut and the nozzle and its carriage can then be quickly moved manually to any desired position.

It is also an object of the invention to provide portable compartments or cannisters for storing the resins of different physical properties, these cannisters being placed in air-tight tanks which are under air-pressure, the compartments or cannisters being easily removed for cleaning.

Other objects and advantages of the invention will appear from the detailed description hereinafter.

In carrying out the invention, a backing sheet, which may be of cellulose acetate, polyvinyl alcohol, or other plastic film, is wound around a cylinder which is the operation of the machine rotates about its axis but is axially in fixed position. Associated with the cylinder is a nozzle through which coalesced pural bands of rods of viscous resin of different color and all the same or different percentage content of luster-producing material are extruded upon the backing sheet, the nozzle being moved automatically parallel to the axis of the cylinder, and so disposed relative to the surface of the backing sheet positioned on the cylinder that a helix of the resinous material is deposited upon the cylinder. The relative speeds of the cylinder and nozzle can be adjustable to regulate the character of the deposits on the cylinders; thus, the speeds can be so determined that the coils of the ribbon extruded by the nozzle abut against each other, or the longitudinal speed of the nozzle can be so reduced that the ribbons overlap to a greater or less extent on the backing sheet. If desired, two or more nozzles can be employed to produce what may be called a double thread of triple thread or other multithread deposit on the cylinder.

In the preferred form of the invention, the nozzle is caused to vibrate in a direction generally parallel to the axis of the cylinder and while it is traveling along the cylinder parallel to the axis thereof.

The apparatus includes limit switches which can be operated by the carriage on which the nozzle is mounted, the switches being preferably in the form of microswitches which are provided with means which allow overrunning of the cylinder for a fractional turn, to allow the discharge of resinous material in the nozzle when the charge of resin thereto is cut off by the pinching of a flexible tube which supplies the resin to the nozzle.

In the accompanying drawings:

FIG. 3 illustrates an enlarged section along the line 3—3 of FIG. 2 and shows the means for oscillating the nozzle and for interrupting the supply of resin thereto;

FIG. 4 is a section along the line 4—4 of FIG. 3 and shows the mechanism for varying the amplitude of oscillation of the nozzle;

FIG. 5 shows an enlarged sectional view of the nozzle in the operative, discharging position, and also the means for pinching off the flow of resin thereto;

FIG. 6 is a front end view of the nozzle;

FIG. 7 shows in section the manifold and the transition member leading to the nozzle, and is taken along the line 7—7 of FIG. 2;

FIG. 8 is a section along the line 8—8 of FIG. 7, and shows the arrangement of the discharge openings for the resin leading into the transition member;

FIG. 9 is a reduced sectional view along the line 9—9 of FIG. 8, and shows the arrangement of the resin supply tubes in the manifold;

FIG. 10 is an enlarged vertical section along the line 10—10 of FIG. 2 and shows the interior construction of one of the storage vessels for resin;

FIG. 11 shows a section along the line 11—11 of FIG. 10;

FIG. 12 is a section along the line 12—12 of FIG. 2;

FIG. 13 is a sectional view taken along the line 13—13 of FIG. 4 and shows the means for adjusting the amplitude of oscillation of the nozzle in enlarged detail;

FIG. 14 illustrates the appearance of the deposited ribbon upon the backing sheet on the cylinder when the nozzle has been oscillated; and FIG. 15 is a view similar to FIG. 14 but shows that layup of the ribbon on the backing sheet when the nozzle is not oscillated the coils being in abutting relation.

Figure 1:
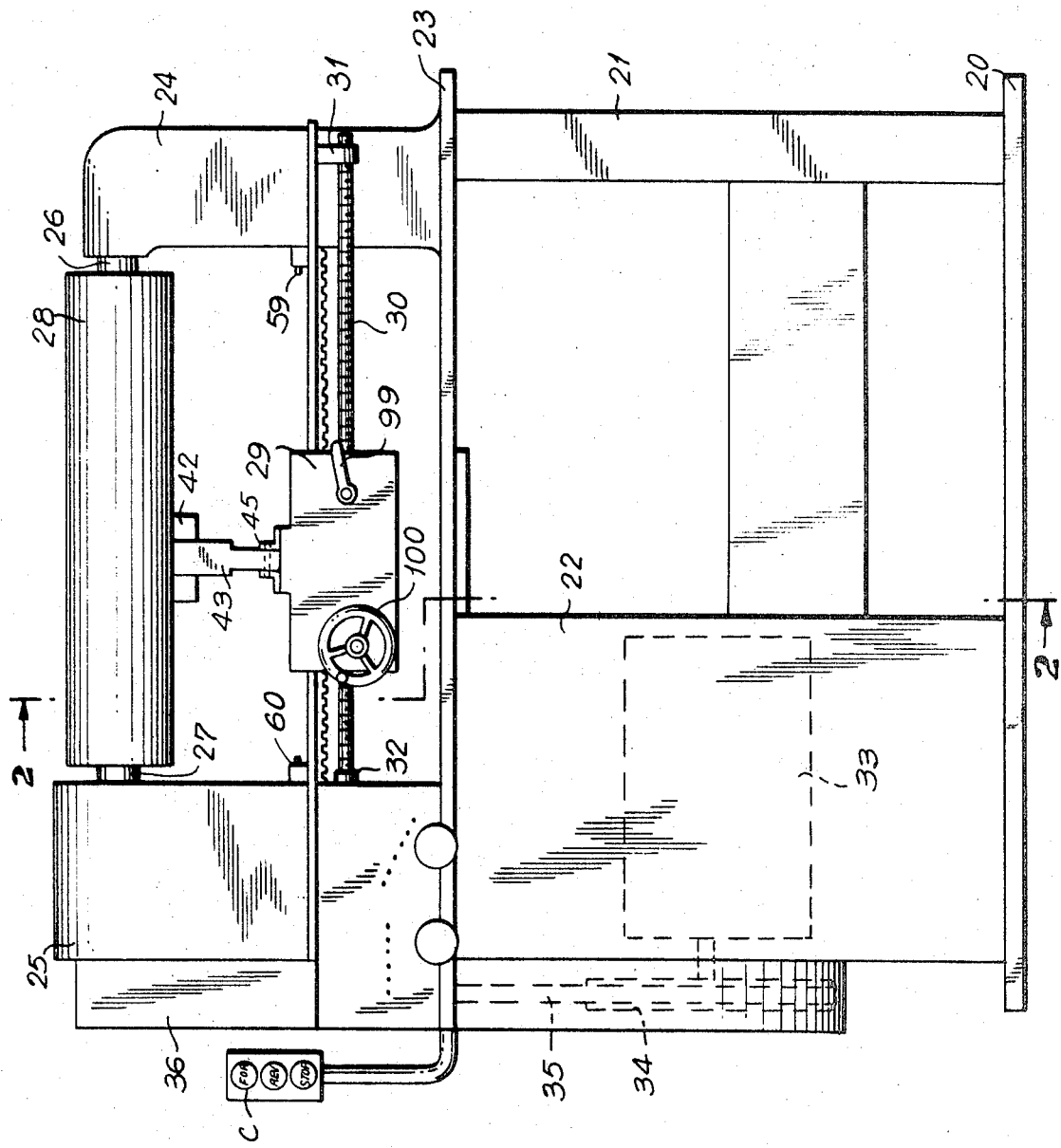
FIG. 1 is a front elevation of a machine constructed in accordance with the invention.

Referring to the drawings, and particularly to FIG. 1, there is shown a bed plate 20 from which rise vertical standards 21 and 22 which support a plate 23 on which are mounted vertical members or posts 24 and 25. These posts provide bearings (not shown) for the spindle 26 and journal 27 of a rotating cylinder 28. Arranged forwardly of the cylinder 28 is a reversible carriage 29 provided with a split nut (not shown) through which passes a lead screw 30 in a manner similar to the tool holder of a lathe, the screw 30 being journaled in brackets 31, 32. A motor drives the machine spindle 27 through belts, step cone pulleys and back gears (not shown), and by way of pulley 34 and belt 35, thus permitting an extensive range of speeds for the spindle as is typical in screw cutting lathes. The cylinder 28 is fixed to the spindle 27 on the spindle end and is supported by the journal 26 and bearings at the other end. The spindle is geared to a quick-change gear box 25 through a set of reversing gears that are controlled by a lever. The quick-change gear box is set thru hand adjusting levers in known manner and will drive the lead screw at a predetermined ratio relative to the cylinder. The lead screw drives the nozzle carrying carriage through the split nut (not shown) which may be disengaged for quick positioning or traverse of the carriage by hand, as is typical in screw cutting lathes.

Figure 2:
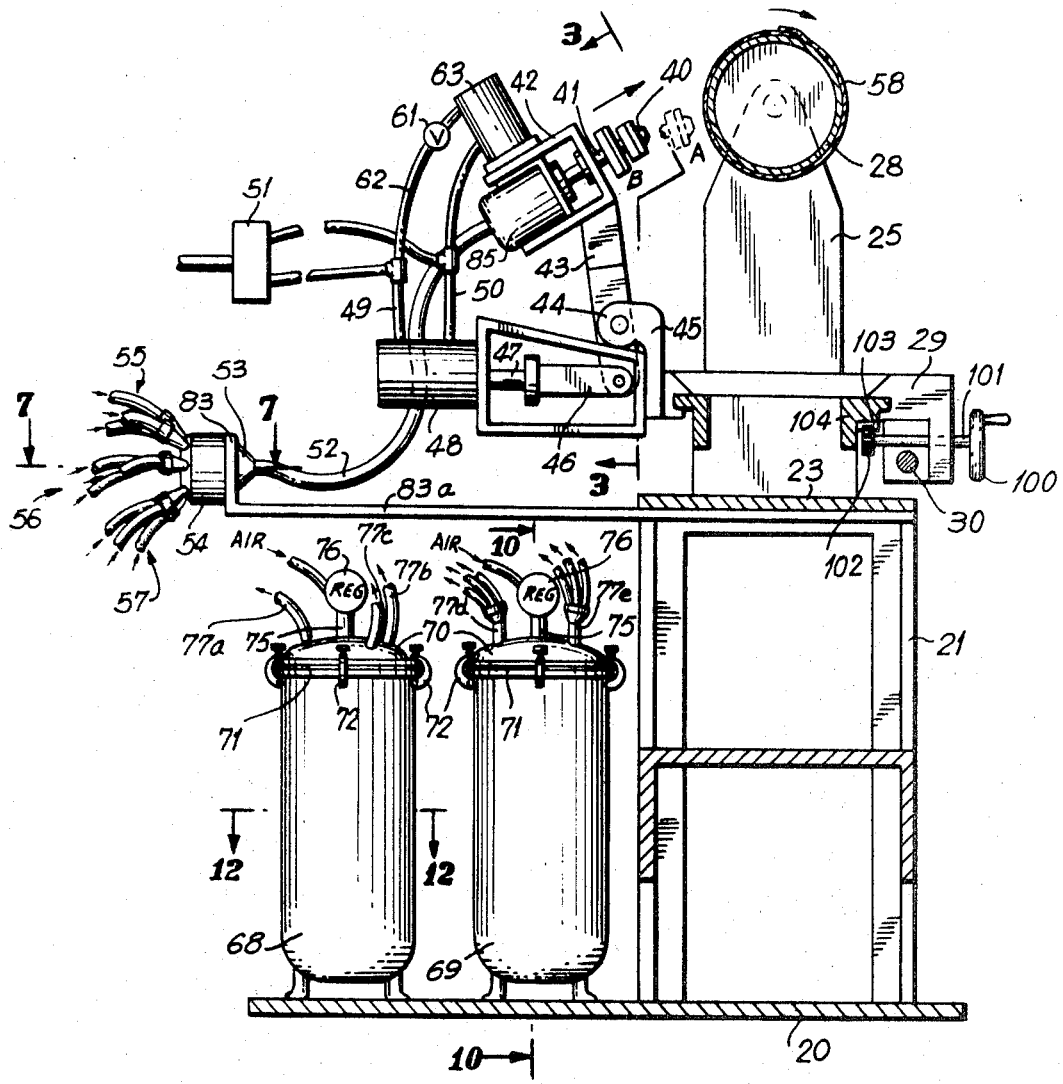
FIG. 2 shows a transverse section along the line 2—2 of FIG. 1 and illustrates the operative and inoperative positions of the nozzle and the supply of differently colored or constituted streams of resin thereto.

An extrusion nozzle 40 is mounted upon the carriage 29 in such manner that in addition to the translatory motion imparted by the lead screw 30, in opposite directions, it can be swung away from the operative position shown in dotted lines at A in FIG. 2 to the inoperative position shown at B in such figure, for a purpose to be described hereinafter. The nozzle is supported by a projection 41 carried by a bracket 42 secured to the upper end of a lever 43 mounted intermediate its ends upon a fixed pivot 44 supported by a pair of posts 45. At its lower end the lever is pivoted to an extension 46 of a piston rod 47 connected to a piston (not shown) within an air cylinder 48 which is charged with air alternately at opposite sides of the piston by means of air lines 49 and 50 leading from a four-way valve 51 which is supplied with compressed air from a source not shown. The valve is solenoid-operated and is controlled by the limit switches (described below) in known manner, the valve at one position supplying compressed air to one side of the piston and exhausting air from the other side, and reversing the flow directions in its other position.

As will be readily understood, the carriage with the nozzle 40 will travel along a path parallel to the axis of the cylinder 28 in the one or other direction, depending upon the direction of rotation of the lead screw 30. As will be explained more in detail hereinafter, the nozzle is connected by way of tube 41 and flexible hose or conduit 52 to a conical transition member 53 (FIG. 7) which serves to compact a plurality of streams of resin received from a manifold 54 supplied by a number of tubes leading from storage tanks to be described below. In the form of the invention illustrated, three groups of tubes each group consisting of three tubes and indicated at 55, 56 and 57, respectively, charge streams of resin into the manifold. The tubes can all feed differently colored streams of resin, or two or more of the nine tubes can convey resin of the same color. All or a part of the nine tubes can charge resin having a pearl essence suspended therein, either in the same concentration in the various tubes or in different concentrations.

The nozzle 40 discharges the compacted streams of resin upon a backing sheet 58 of plastic material, such as cellulose acetate, polyvinylalcohol or other pliable film. The film is wound snugly about the cylinder 28 and is of greater width than the length of travel of the nozzle parallel to the cylinder. The plastic film can be held immovably upon the cylinder by means of magnetic clamps, i.e., by magnets of arcuate form which fit over the side marginal portions of the overlapping ends of the film; or the film can be held in place by means of elastic bands; or the ends of the film can fit into a longitudinally extending groove in the surface of the cylinder. In the illustrated form of the invention the ends of the film overlap (FIG. 2) and the ends of the film are held in place by means of an elastic band (not shown) at each end of the cylinder.

At the end of its run in either direction, the carriage 29 trips a limit switch 59 or 60 which operates after a delay equivalent to a fractional turn, e.g., an approximately quarter or half turn of the cylinder to stop the motor 33. However, promptly upon operation of a limit switch, mechanism is set into motion which interrupts the flow of the viscous resin to the nozzle. This is accomplished by the operation of the solenoid-controlled four-way valve 51 and by throttling valves 61 in an air line 62 connected with the valve 51 and in lines connected to each of the two exhaust ports of valve 51 and leading to an air cylinder 63 containing a piston to which is connected a rod 64 (FIG. 5) terminating in a pressure member 65. Upon activation of the valve 51, the pressure member 65 is moved against the flexible resin supply hose 52 to compress the same against an abutment 66 to interrupt the flow of resin to the nozzle 40. As the tube is compressed, a certain amount of resin will continue to be extruded by the nozzle and this will be taken up by the cylinder during its fractional turn overrun. A slight interval after activation of air cylinder 63 and cylinder 48 moves the nozzle 40 through links 42 and 43 to position B in FIG. 2.

The resin is charged into the nozzle under pressure by way of the hose 52, transition member 53 and manifold 54 in the following manner: In the form of the invention illustrated, there are provided two tanks 68 and 69 (FIGS. 2, 10, 11 and 12) both of cylindrical shape and provided with a cover 70 having a peripheral flange which cooperates with a similar flange at the top of the tanks, and with an interposed gasket, to seal the interior of the tanks, the flanges being held in air-tight relation by means of clamps 72. Each of the tanks 68, 69 contains a plurality of receptacles or compartments for storing a quantity of resin having different physical characteristics with respect to color, quantity and type of suspended pearlessence or other properties. By way of example, the tank 68 is shown as containing three separate receptacles 63, which are partially filled with masses of resin 67a, 67b and 67c. The other tank 69, on the other hand, may house only two receptacles 74, which are partially filled with masses of resin 67d and 67e which may differ in physical properties not only from each other but also from the resin masses in the tank 68. Passing through and sealed in the cover of the tank 68 is an air supply duct 75, while a similar duct 75 passes through and is sealed in the cover of the tank 69. Both ducts are connected to the source of compressed air by way of a pressure regulating valve 76.

Extending to nearly the bottom of the respective receptacles and emerging through sealed openings in the cover of the respective tanks are discharge tubes 77a, 77b, 77c, 77d and 77e. The regulating valves 76 maintain the pressure in the space in the upper portion of the tanks at such a value that the viscous resin is forced to flow under into the discharge tubes 77a to 77e.

Depending upon the particular pattern that it is desired to produce in the mass of resin distributed upon the plastic film 58 about the cylinder 28, the resin discharged from the different receptacles may or may not be divided into a plurality of individual streams. Thus the resin supplied by the receptacles 73 will not be subdivided each into two or more separate streams, while the resin supplied by the receptacles 74 can be subdivided by means of a manifold 78 into two, three or more streams, as indicated at 79. The resin supply tubes leading from the tanks 68 and 69 can then be arranged into a number of groups in any desired combination, and thus may be formed into the groups 55, 56 and 57, as shown in FIG. 2, these groups in the present embodiment constituting three in number and each composed of three supply tubes. The ends of the tubes are connected in resin-tight relation with conical fittings 80 which are threadedly secured in conical openings 81 in the manifold 54 (see FIGS. 7, 8 and 9). Streams of resin flow through the channels 81 and into the conical transition member 53 which compacts the streams of resin while keeping them in the approximate arrangement determined by the spatial relationship of the groups of tubes 55, 56 and 57. The combined mass of resin then flows in a single stream into the flexible tube 52 connected to the entrance channel 82 of the nozzle 40 (FIG. 5). As can best be seen from FIGS. 2 and 7, the manifold 54 is supported by means of the arms 83 on an extension 83a secured to plate 23 of the machine frame; while the transition member 53 is attached to the manifold by machine screws 84.

More beautiful and shimmering iridescent effects with more complex mingling of colors and reflecting pearlessence surfaces are obtained by oscillating the nozzle as it discharges the composite stream of resin upon the plastic film wrapped around the cylinder 28. To effect such oscillation, there is provided, in the form of the invention illustrated, an electric motor 85 (FIGS. 3 and 4) which through a piston 86 drives a gear 87 mounted on a shaft 88 at whose opposite end there is secured a circular plate 89 which is bored to receive a circular disc 90. The disc carries an eccentric pin 91 which is received in an opening in a bracket 92 secured to one side of a plate 93 through which passes the entrance channel 82 of the nozzle 40. The plate 93 is provided with elongated slots 94 through which pass guide pins 95.

By varying the size and/or shape of the nozzle discharge opening and by varying the distance between the nozzle and the cylinder the thickness of the deposit on the cylinder 28 can be regulated, and by varying the number and arrangement of the supply tubes variations in the iridescent colors of the articles molded from the deposited resin can be obtained. Also, by varying the relative speeds of the cylinder and nozzle, different degrees of overlap of the ribbons of resin deposited on the plastic film can be controlled, or the coils of resin on the cylinder can be deposited in abutting relation.

FIG. 15 indicates diagrammatically the layup of the ribbon of resin on the film 58 wound on the cylinder 28, the resin being preferably any of the heat-endurable addition-type, such as catalysed polyester, resins disclosed in the patent to Trojanowski et al., No. 2,962,764, dated Dec. 6, 1960. The coils of ribbon are shown as being in abutting relationship, but as will appear from the foregoing, they may overlap to a predetermined degree or even be spaced from each other. In FIG. 14, there is shown the appearance of the ribbons of resin when the nozzle is oscillated as it travels parallel to the axis of the cylinder.

The amplitude of oscillation of the nozzle can be varied by rotation of the circular disc 90 (see FIG. 13) with reference to the circular plate 89. Thereby the distance of the eccentric pin 91 from the center of the rotating plate 89 can be varied and hence the throw or amplitude of oscillation of the nozzle varied. The disc 90 is held in adjusted position by means of a locking or set screw 97.

The plate 93 is retained in engagement with the guide pins 95 projecting from the spaced members 96 by the aid of washers 98 held in place against the ends of pins 95 by means of screws or the like. The rigid nozzle entrance channel member 82 passes through the plate 93, as seen best in FIG. 4, and it will be evident that upon rotation of the circular plate 89, the nozzle will be oscillated at a frequency depending upon the speed of the shaft 88, which can be varied by changing the pinion 86 and meshing gear 87 where the speed of the motor is constant, or by the use of a variable speed motor.

While the resinous layer composed of juxtaposed or over-lapping bands or ribbons of resin might be deposited directly upon the surface of a cylinder which is of releasing character, i.e., will not adhere to the resin, so that the sheet of resin can be stripped off after being cut along the length of the cylinder, I prefer to employ a backing sheet which itself may or may not be of releasing character. Where the mold into which the composite sheet is to be charged is provided with mold cavities on both the upper and lower parts thereof, I prefer to employ a polyvinyl alcohol film of highly stretchable character, or a similar film, as is described in the above-mentioned patent to Trojanokski et al.

In the operation of the machine, the nozzle carriage 29 being assumed to be at its left limit of travel as viewed in FIG. 1, the attendant winds a cellulose acetate or other plastic sheet or film about the cylinder 28, and fixes the ends of the film on the cylinder, as by means of elastic bands or, as indicated above, by magnetic clamps, or also by clips which engage extensions of the cylinder, or in any other suitable manner. The operator then presses the Forward Button, shown at station or panel C, and the cylinder starts to rotate and at the same time the carriage 29 is caused to travel towards the right by the lead screw 30. At the same time the air cylinder 48 receives air under pressure at the right of its piston (FIG. 2) and the nozzle is moved into position adjacent to the surface of the plastic film. By the time the nozzle reaches its operative position, the air cylinder 63, which actuates the pressure head pinching device 65, receives compressed air at one side of its piston which then moves to retract the pressure head 65, and resin begins to flow under the pressure of the air in the air spaces above the bodies of resin in the tanks 68 and 69. The resin flows through the tubes 77a to 77e, and either directly or through the subdividing manifolds 78, the tubes charge the different bodies of resin into the manifold 54 from which the composite mass of resin passes through tube 52 to the nozzle.

If the nozzle is not to be oscillated, then the motor 85 is disconnected by a series switch and the mechanism shown in FIGS. 3 and 4 is then rendered inactive. When the motor 85 is in operation, the plate 93 is oscillated by the eccentric pin 91 and thereby the nozzle 40 is reciprocated through a distance determined by the displacement of the pin 91 from the center of the circular plate 89. When the nozzle carriage 29 reaches the limit of its movement (which is less than the width of the film on the cylinder 28) its carriage trips the limit switch 59 at the right of the machine and thereupon air is charged into the cylinder 63 by way of the solenoid operated valve 61 and the pressure head 65 (FIG. 3) is actuated to pinch off the supply of resin to the nozzle. The microswitch is however, provided with a delay mechanism which allows the cylinder 28 to make a fractional turn of, say, 90° or 180° after the tube 52 has been pinched off, after which the cylinder 28 is finally stopped by interrupting the circuit to the motor 33. Simultaneously with the operation of the pressure head 65 the motor 85 is cut off. When the cylinder 28 stops rotating, a timing device (not shown), causes the charge of compressed air to the left side of the piston in the air cylinder 48 to cause the rod 47 to move toward the right (FIG. 2), and therby effect swinging of the nozzle to the inoperative position. The resin-covered plastic film is then removed from the cylinder and brought to a two-part mold, such as that shown in the patents to George Trojanowski and Lawrence Brandt, Nos. 2,962,764 and 2,962,767, both dated Dec. 6, 1960. The operator then places a new plastic film around the cylinder 28 and presses the Reverse button at C (FIG. 1).

The pearl essences can be of the types disclosed in the above-mentioned patents, both organic and inorganic, or any other type, such as inorganic crystals of lead compounds, which can withstand the heat of the compression mold.

The timing of the operation of the cylinders can be controlled pneumatically in known manner by the use of valves which in one direction permit rapid discharge of air while in the opposite direction they throttle the supply of air or the discharge of exhaust air thereby adjusting and regulating the timing sequence of the cylinders. These throttle valves are set in known manner to regulate the delay periods.

Upon operation, either the "Forward" or "Reverse" button is momentarily depressed, depending upon the direction in which the nozzle carriage is to travel; thereupon the sequence of cylinder operations is begun through the solenoid valve, as explained above. The motor 85 is then also started to oscillate the nozzle 40.

As indicated above, I prefer that the switches and gearing be so constructed and related that while the nozzle travels in opposite directions, the cylinder, when rotating, always moves in the same direction, so that the same side or face of the extruded ribbon always is brought into contact with the film. In consequence, the same layup is deposited on the film in both directions of travel of the nozzle, so that a film is coated in both directions of travel of the nozzle and continuously in the same manner. This is of particular advantage when the extruded ribbon of resin is of different composition at the opposite sides thereof, so that uniformly appearing molded products are obtained with all of the coated films.

It was mentioned above that the split nut by which the lead screw 30 is driven may be disengaged for quick positioning of the nozzle carriage 29. The carriage is in such case hand propelled by handwheel 100 (FIGS. 1 and 2) which by way of shaft 101 drives a pinion 102 which rides on and is guided by a rack 103 forming part of or secured to an angle member 104.

To minimize flow and intermingling between the deposited areas or coils of resin during the interval between the removal of the coated film from the cylinder and its placement in the mold, the coated film may be chilled or frozen and kept at such reduced temperature until the mold is ready to receive it.

I claim:

1. Apparatus for distributing a moldable resin upon a backing film preparatory to placing the coated film in a mold, comprising a cylinder about which a backing film is wound and to which the film is secured so as to rotate therewith, a nozzle, means for supplying the nozzle with a viscous moldable resin under a pressure head, the nozzle being arranged to extrude the resin upon the backing film on said cylinder, means for moving the nozzle back and forth over the film substantially parallel to the axis of the cylinder, means for supporting the cylinder against movement in the axial direction, means for rotating the cylinder and means disposed at the opposite ends of the cylinder for effecting reversal of the movement of the nozzle after it reaches the limit of its movement in either direction.

2. Apparatus according to claim 1, including means for oscillating the nozzle in a plane transverse to the direction of the discharge of the resin.

3. Apparatus according to claim 2, including means for varying the amplitude of oscillation of the nozzle.

4. Apparatus according to claim 3, wherein the last-mentioned means comprises a linearly oscillatable plate connected to the nozzle, an eccentric for oscillating the plate, and means for rotating the eccentric.

5. Apparatus according to claim 1, including means for interrupting the flow of resin to the nozzle when it reaches a limit of its movement.

6. Apparatus according to claim 5, wherein the means for interrupting the flow of resin to the nozzle comprises a pinching member and means for effecting operation of the pinching member as the nozzle reaches a limit of its movement.

7. Apparatus according to claim 1, wherein the nozzle is supported upon a travelling carriage, and wherein the carriage strikes a limit switch at the end of its movement, the limit switches operating to effect stoppage of the cylinder roating means after a delay corresponding to a fractional turn of the cylinder.

8. Apparatus according to claim 7, including means mounted on the nozzle carriage and controlled by the switch after a time delay to move the nozzle away from the cylinder.

9. Apparatus according to claim 8, wherein the last-mentioned means comprises an air cylinder having a movable piston therein, and a piston rod connected to the piston and to the nozzle.

10. Apparatus according to claim 1, including a resin storage tank, portable compartments in said tank for different bodies of resin, means for supplying a compressed gas to the space above the bodies of resin, and tubes extending to nearly the bottom of the bodies of resin and into which the resin is forced under the pressure of the compressed gas.

11. Process for metering and distributing a mass of heat-moldable resin upon a backing film for charging into a heated compression mold, which comprises winding the backing film about a cylinder, the film being composed of a material which is separable from the molded articles without damage to the latter, removable securing the film to the cylinder, rotating the cylinder while keeping it immovable in the axial direction, and extruding a stream of viscous heat-hardenable resin through a nozzle and onto the backing sheet while moving the nozzle in a direction parallel to the axis of the cylinder and for substantially the length of the cylinder.

12. Process according to claim 11, wherein after the nozzle reaches its limit of movement in one direction, the feed of resin is stopped, the coated film is removed from the cylinder and a fresh film wound about the cylinder, and the nozzle is then moved in reverse direction while the feed of resin is resumed, and while the cylinder rotates in the same direction as before.

13. Process according to claim 11, wherein the nozzle is oscillated in the direction of the axis of the cylinder as it moves along the length of the cylinder.

References Cited

UNITED STATES PATENTS

| | | | |
|---|---|---|---|
| 983,743 | 2/1911 | Mertens | 118—321 |
| 1,141,320 | 6/1915 | Crump | 117—94 |
| 1,953,330 | 4/1934 | Andres | 117—105.5X |
| 2,246,502 | 6/1941 | Bramsen et al. | 118—7 |
| 2,775,257 | 12/1956 | Stirn et al. | 118—7UX |
| 3,155,540 | 11/1964 | Loeffler et al. | 117—44X |
| 3,416,943 | 12/1968 | Clark et al. | 117—44 |

RALPH S. KENDALL, Primary Examiner

U.S. Cl. X.R.

117—45, 94, 159; 118—7, 321; 264—75, 279